United States Patent
Oda et al.

[19]

[11] Patent Number: 5,927,007
[45] Date of Patent: Jul. 27, 1999

[54] PLANT CULTURE VESSEL

[75] Inventors: Fumiaki Oda; Tomokazu Kitano; Yuichi Yonetsu, all of Amagasaki, Japan

[73] Assignee: Kubota Corporation, Osaka, Japan

[21] Appl. No.: 08/790,156

[22] Filed: Jan. 28, 1997

[51] Int. Cl.$^6$ .................................................. A01G 31/00
[52] U.S. Cl. .................................................. 47/60; 47/63
[58] Field of Search ................................. 47/59, 60, 61, 47/62, 63

[56] References Cited

U.S. PATENT DOCUMENTS

| | | | |
|---|---|---|---|
| 2,993,300 | 7/1961 | Sawyer | 47/61 |
| 3,199,250 | 8/1965 | Sawyer | 47/63 |
| 4,106,235 | 8/1978 | Smith | 47/59 |
| 4,135,331 | 1/1979 | Lamlee | 47/61 |
| 4,148,154 | 4/1979 | King | 47/61 X |
| 4,166,341 | 9/1979 | Vestergaard | 47/59 |
| 4,180,941 | 1/1980 | Korematsu | 47/61 X |
| 4,763,804 | 8/1988 | O'Connell | 215/307 |
| 4,976,064 | 12/1990 | Julien | 47/63 |
| 5,375,372 | 12/1994 | Lee et al. | 47/60 X |

FOREIGN PATENT DOCUMENTS

| | | | |
|---|---|---|---|
| 0439842 | 8/1991 | European Pat. Off. | B65D 41/04 |
| 829094 | 6/1938 | France . | |
| 1067922 | 6/1954 | France | 47/63 |
| 9203963 | 8/1992 | Germany . | |
| 6411622 | 4/1966 | Netherlands | 47/63 |
| 2139465 | 11/1984 | United Kingdom . | |
| 2185373 | 7/1987 | United Kingdom | 47/59 |
| 2283224 | 5/1995 | United Kingdom | B65D 23/00 |
| 2642 | 8/1982 | WIPO | 47/59 |

*Primary Examiner*—John A. Ricci
*Attorney, Agent, or Firm*—Fulbright & Jaworski, LLP

[57] ABSTRACT

A plant culture vessel includes a vessel body capable of housing therein a plant mount for mounting thereon a plant to be cultured and a culture medium for culturing the plant, and a top lid detachably attached to the vessel body. A support portion is provided on a peripheral wall of the vessel body in the form of a reduced-diameter portion projecting to the inside of the vessel body. The culture medium is housed in a space downwardly of the plant mount as supported on the support portion. A vertical communicating portion is provided between an outer edge of the plant mount and an inner peripheral wall portion of the vessel body for allowing vertical insertion of an instrument including a culture medium replacing instrument therethrough to the space downwardly of the plant mount.

15 Claims, 5 Drawing Sheets

PLANT CULTURE VESSEL

BACKGROUND OF THE INVENTION

1. Field of the Invention

The present invention relates to a plant culture vessel, and more particularly to a plant culture vessel including a vessel body capable of housing therein a plant mount for mounting thereon a plant to be cultured and culture solution, and a top lid detachably attached to the vessel body.

2. Description of the Related Art

A conventional plant culture vessel of the above-noted type typically includes a cylindrical vessel body having a bottom. With such plant culture vessel, its vessel body is adapted for accommodating therein a plant culture solution (to be referred to as culture medium hereinafter) as well as a plant mount comprised of a metal mesh including support legs, so that the plant to be cultured, as mounted on the metal mesh, may be supplied with both ambience air and the culture medium.

However, with such conventional plant culture vessel having the above construction, when the vessel body is vibrated in order to supply the plant with both ambience air and the culture medium, the plant mount tends to become unstable whereby the plant mounted on the plant mount may fall therefrom. For this reason, in order to prevent such fall of the plant, there has been proposed a construction in which a support portion for supporting the mounted plant is provided on a peripheral wall of the vessel body in the form of a reduced-diameter portion projecting from the peripheral wall of the vessel body to the inside of the body, so as to support thereon the plant mount sized to contact or substantially contact with the peripheral wall of the vessel body, thus supporting the plant mounted thereon.

However, in the case of the plant culture vessel having the proposed construction described above, the plant mount is sized so as to contact or substantially contact the peripheral wall. Then, when the culture medium is to be replaced, this is possible only after removing the plant mount from the vessel body.

For this reason, in the case of e.g. the plant having grown to have considerably thick leaves, the above operation tends to expose the plant to contamination with bacteria. Hence, the handling of the vessel has been difficult.

In view of the above, a primary object of the present invention is to provide an improved plant culture vessel which allows easier handling in the case of replacement of the culture medium while assuring stable support of the plant.

SUMMARY OF THE INVENTION

For accomplishing the above-noted object, a plant culture vessel, according to the characterizing features of the invention, comprises:

- a vessel body capable of housing therein a plant mount for mounting thereon a plant to be cultured and a culture medium for culturing the plant;
- a top lid detachably attached to the vessel body;
- a support portion provided on a peripheral wall of the vessel body in the form of a reduced-diameter portion projecting to the inside of the vessel body, the culture medium being housed in a space downwardly of the plant mount as supported on the support portion; and
- a vertical communicating portion provided between an outer edge of the plant mount and an inner peripheral wall portion of the vessel body for allowing vertical insertion of an instrument including a culture medium replacing instrument therethrough to the space downwardly of the plant mount.

With the above construction, this plant culture vessel can house the plant to be cultured and can also support the plant mount therein, so that the the plant may be supplied with air and the culture medium by vibrating the vessel.

Moreover, as the vertical communicating portion is provided between an outer edge of the plant mount and a portion of the inner peripheral wall of the vessel body for allowing vertical insertion of an instrument including a culture medium replacing instrument therethrough to the space downwardly of the plant mount. Hence, while the plant mount is maintained inside the vessel body, the culture medium may be conveniently replaced, when necessary, by vertically inserting the culture medium replacing instrument through the vertical communicating portion to the space downwardly of the plant mount.

Therefore, the replacement of the culture medium is readily possible without removing the plant mount from the inside the vessel body, thus hardly exposing the plant to bacterial contamination. As a result, the plant may be cultured in a healthy manner without bacterial contamination.

Preferably, a downwardly extending face inside the vessel connecting between the reduced-diameter portion and an inner peripheral wall portion other than the reduced-diameter portion has a downwardly widening tapered shape.

With the above, even if the culture medium becomes contaminated, the inner peripheral wall portion accommodating this medium and located downwardly of the plant mount may be readily cleaned, achieving further convenience of the maintenance.

Preferably, upwardly of the support portion of the vessel body, there is formed an upwardly widening plant accommodating portion.

With the above, when the plant has grown to obtain thick leaves, the upwardly widening plant accommodating portion restricts crowding of these leaves. Hence, the insertion operation the culture medium replacing instruction from the above may be readily effected without being interfered with by the plant leaves.

Still preferably, one of the vessel body and the top lid includes a male thread in an outer wall thereof, while the other includes a matching female thread engageable with the male thread; and on side opposite to a cylindrical opening of the male thread, there is formed a tapered portion having an increasing diameter away from the opening, such that when the female thread and the male thread become engaged with each other a lower end portion of the female thread on the side of the opening comes into tight contact with the tapered portion.

With the above, the vessel body and the top lid may be connected firmly with each other, assuring reliable sealing therebetween.

Further, on side opposite to the cylindrical opening of the male thread, there is formed the tapered portion having an increasing diameter away from the opening, such that when the female thread and the male thread become engaged with each other a lower end portion of the female thread on the side of the opening comes into tight contact with the tapered portion. Accordingly, if e.g. the male thread and the tapered portion are provided on the outer wall portion of the vessel body and the female thread is provided to the top lid, then, with threading of the top lid to the vessel body, the end portion of the top lid on the side of the opening comes into loaded contact with the tapered portion of the vessel body, thus effectively preventing entry of bacteria to the inside of the plant culture vessel. Moreover, when the vessel body and the top lid are maintained under the sealed state through the threaded-engagement with each other, the male tread and the female thread are located inside this sealed vessel. Then, this may further reduce the possibility of bacterial contamination. Also, in opening or closing the top lid, if some operation becomes necessary for passing, above the opening of the vessel body, either thread which has been contaminated with bacteria, there will not occur such inconvenience as inadvertently allowing the bacteria attached to the lid to be dropped into the vessel body to contaminate the plant.

Accordingly, the plant culture vessel may culture a healthy plant without bacterial contamination. Consequently, it is possible to prevent the plant from being killed by bacteria or to avoid prevention of healthy growth of the plant as being unable to adapt itself to the environment outside the vessel due to the influence from the bacteria.

As a result, with the simple improvement of the plant culture vessel described as above, it has become possible to significantly increase the plant culturing efficiency, so that a healthy plant may be obtained with small labor and at lower costs.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of a plant culture vessel relating to the present invention will be described in details with reference to the accompanying drawings.

Figure 1:
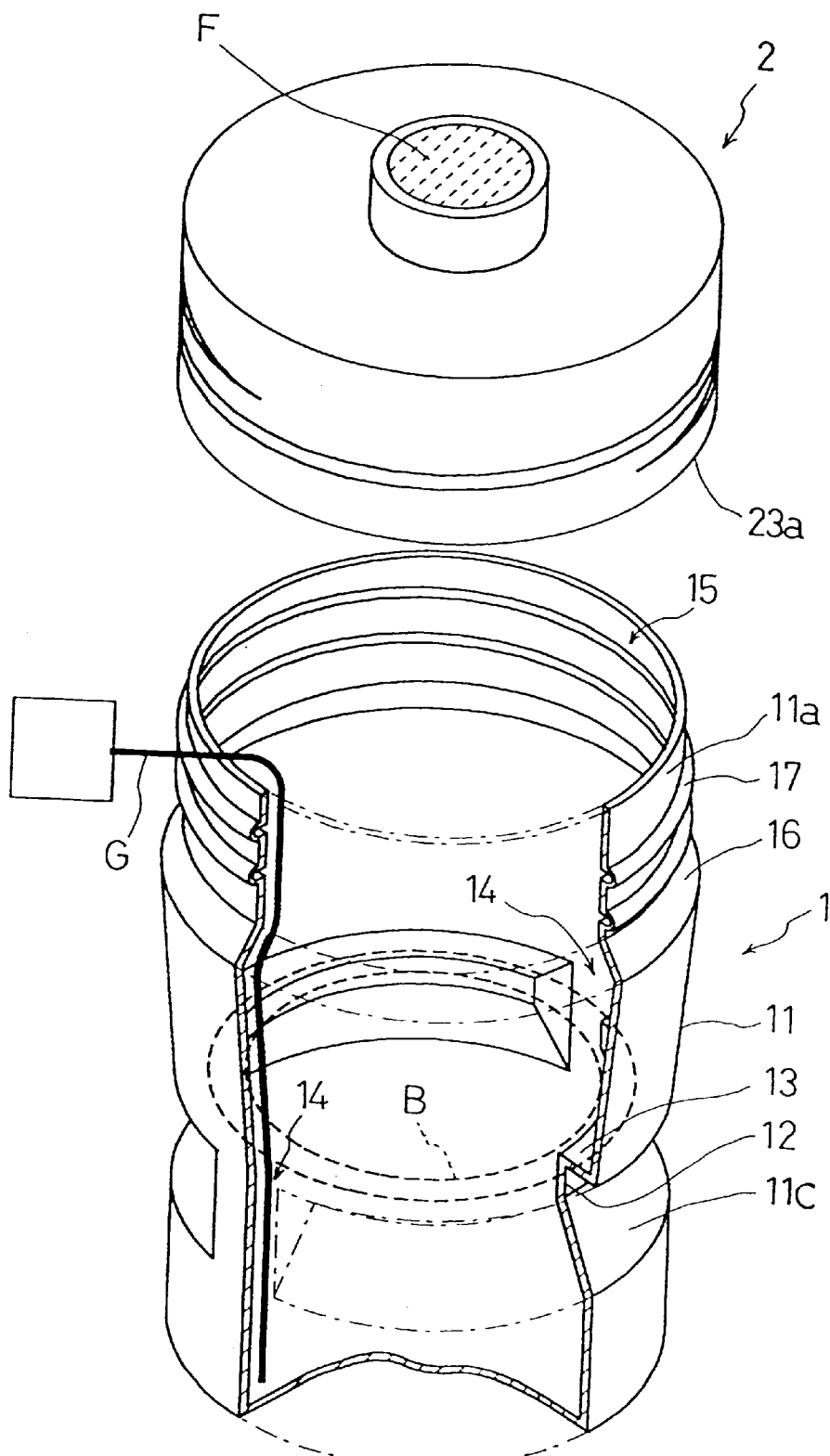
FIG. 1 is an exploded perspective view of a plant culture vessel relating to one preferred embodiment of the present invention.
Figure 2:
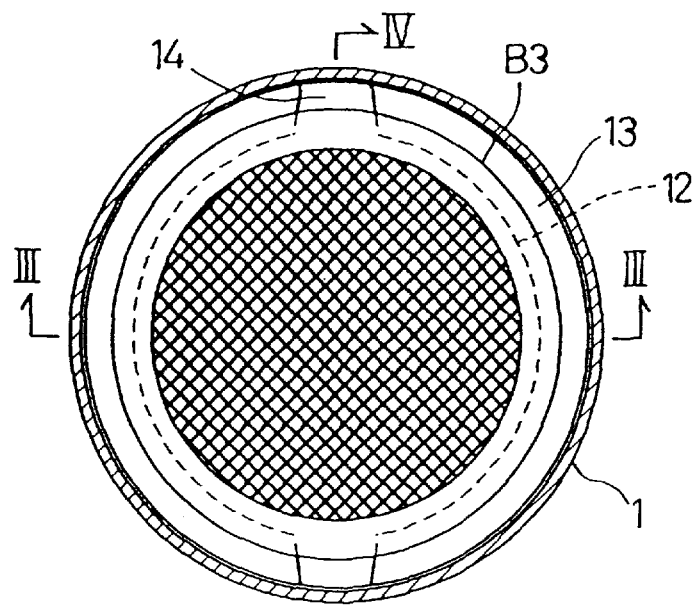
FIG. 2 is a plan view in horizontal section showing principal portions of the plant culture vessel with a plant mount being used therein.
Figure 3:
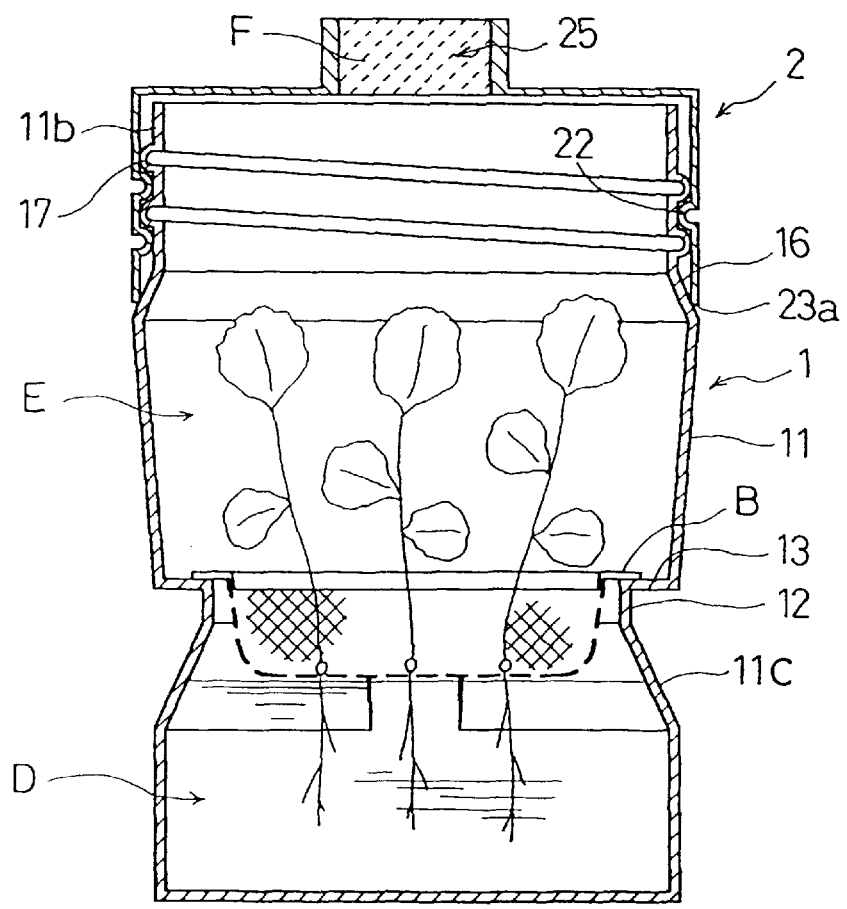
FIG. 3 is a section taken along a line III—III in FIG. 2.
Figure 4:
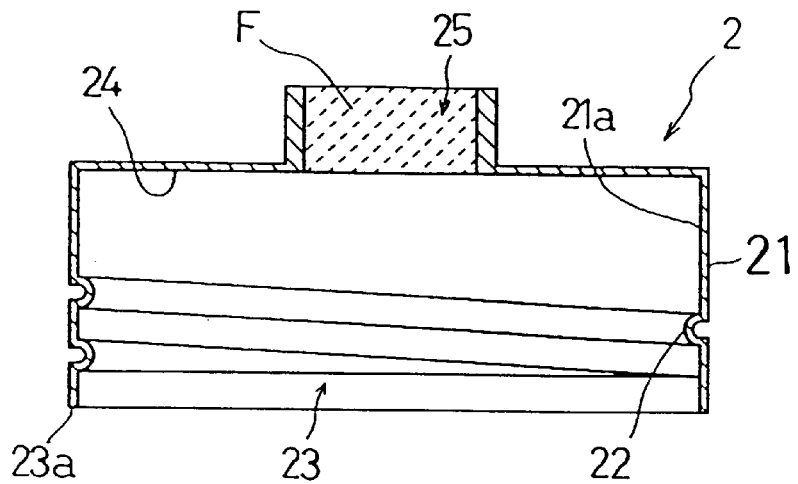
FIG. 4 is a section taken along a line IV—IV in FIG. 2.
Figure 4:
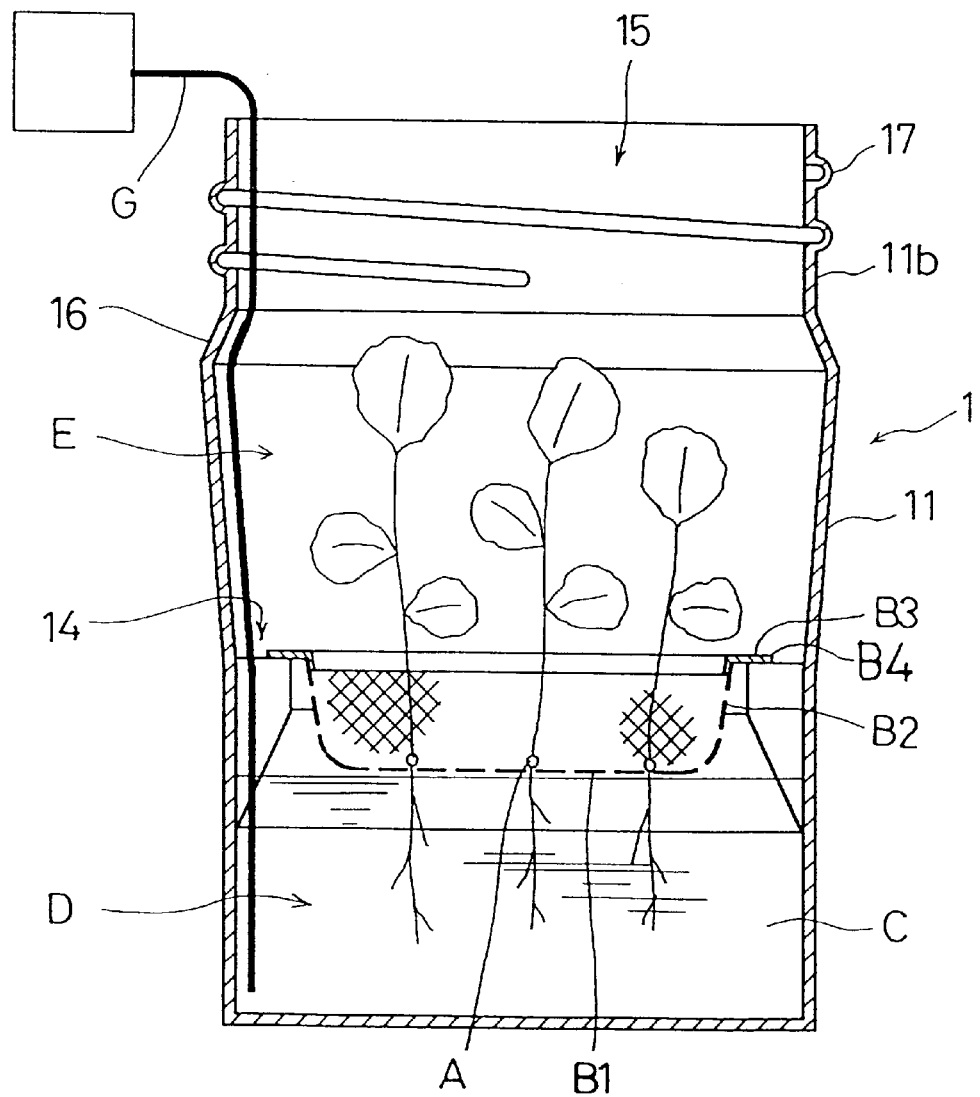

FIGS. 1 and 2 show a plant culture vessel relating to one preferred embodiment. This vessel includes a vessel body 1 capable of accommodating therein a plant mount B for mounting thereon a plant A (e.g. a seedling of strawberry) to be cultured as well as a culture solution C for culturing the plant A, and a top lid 2 to be detachably attached to the vessel body 1.

The vessel body 1 is a substantially cylindrical vessel having a bottom and made from a transparent material (resin material such as acrylic resin, polystyrene resin, polycarbonate resin, vinyl chloride resin or the like, or glass material). The cylindrical body 1 includes a cylindrical peripheral wall 11 which forms a pair of reduced-diameter portions 12 each extending substantially through a half of the periphery of an inner peripheral wall portion 11a of the vessel body. And, an upper face inside the vessel body interconnecting the reduced-diameter portions 12 with an inner wall portion 11a other than the reduced-diameter portions 12 is provided as a support portion 13 for supporting the plant mount B. The inner diameter between the opposed reduced-diameter portions 12 is increased to be substantially equal to an inner diameter of a cylindrical portion of the vessel body 1 downwardly of the reduced-diameter portions 12, thus providing vertical communicating portions 14. With the above, inside the vessel body 1, there is formed a culture medium accommodating space D downwardly of the support portion 13, while a plant accommodating space E is formed upwardly of the support portion 13.

At the culture medium accommodating space D, a downwardly extending face 11c interconnecting the reduced-diameter portions 12 and the inner wall portions 11a other than the reduced-diameter portions 11a has a downwardly widening tapered shape so as to accommodate the culture solution in a fluid-tight state with the lower space in the vessel body 1.

At the plant accommodating space E, the peripheral wall 11 of the vessel body 1 has an upwardly widening taped shape. And, on a side of an opening 15 of the plant accommodating space E, there is formed a tapered portion 16 having an increasing diameter away from the opening 15 (i.e. toward the bottom of the vessel). On the side of the tapered portion 16 further toward the opening 15, a male thread 17 is formed on an outer peripheral wall portion 11b.

The top lid 2 is a cylindrical shape with a top bottom. And, an inner wall portion 21a of the top lid 2 includes a female thread 22, which is engageable on the male thread 17 formed on the outer wall portion 11b of the vessel body. Further, a lower end portion 23a of the top lid 2 on the side of the opening 23 comes into tight contact with the tapered portion 16 of the vessel body 1 when the female thread 22 and the male thread 17 are engaged with each other. That is, with the threading engagement of the top lid 2 with the vessel body 1, the lower end portion 23a of the top lid 2 on the side of the opening 23 gradually comes into loaded contact with the tapered portion 16 of the vessel body 1, thereby to prevent entry of bacteria into this plant culture vessel.

An upper bottom portion 24 of the top lid 2 defines an air communicating opening 25, which is filled with a filler material (e.g. anti-bacterial sponge or the like) for preventing entry of bacteria, thus assuring air-permeability while preventing entry of bacteria.

The plant mount B includes a metal mesh B1 in the form of an opened cage and a flange-like frame portion B3 attached to an edge portion B2 of the metal mesh B1. The vessel body 1 is sized such that the respective reduced-diameter portions 12 have an inner diameter greater than an outer diameter of the edge portion B2 and smaller than an outer diameter of the frame portion B3 and also that the respective large-diameter portions (i.e. the vertical communicating portions 14) have an inner diameter greater than the outer diameter of the frame portion B3. With these, the frame portion B3 may be mounted and supported on the support portion 13. That is to say, between an outer edge B4 of the frame portion B3 and the inner peripheral wall of the large-diameter portion at the vertical communicating portion 14, there is formed a significant gap, through which a portion of a culture solution replacing instrument G (e.g. a pipe instrument) may be readily inserted from above the plant mount B to under this plant mount B.

An experiment was conducted with using the plant culture vessel having the above-described construction. In this experiment, culture medium was accommodated at the culture medium accommodating space C and a strawberry seedling A was placed on the plant mount B, which in turn was supported on the support portion 13. Then, under this condition, the entire plant culture vessel was vibrated. As a result, the strawberry seedling A was brought into effective contact with the ambience air and the culture medium, such that the air and the medium was supplied efficiently to the seedling A.

Next, other embodiments of the invention will be specifically described.

(1) The reduced-diameter portions are not limited to those described above. The reduced-diameter portions may be provided in the form of a large number of projections projecting to the inside of the vessel body. In short, the reduced-diameter portion may be constructed in any manner, as long as it can support the plant mount B while allowing effective contact between the plant A mounted on the mount B and the air and culture medium. In such case, the inner peripheral wall of each projection will correspond to the reduced-diameter portion. In this way, the number and size of the reduced-diameter portion are not particularly limited in the present invention.

Figure 5:
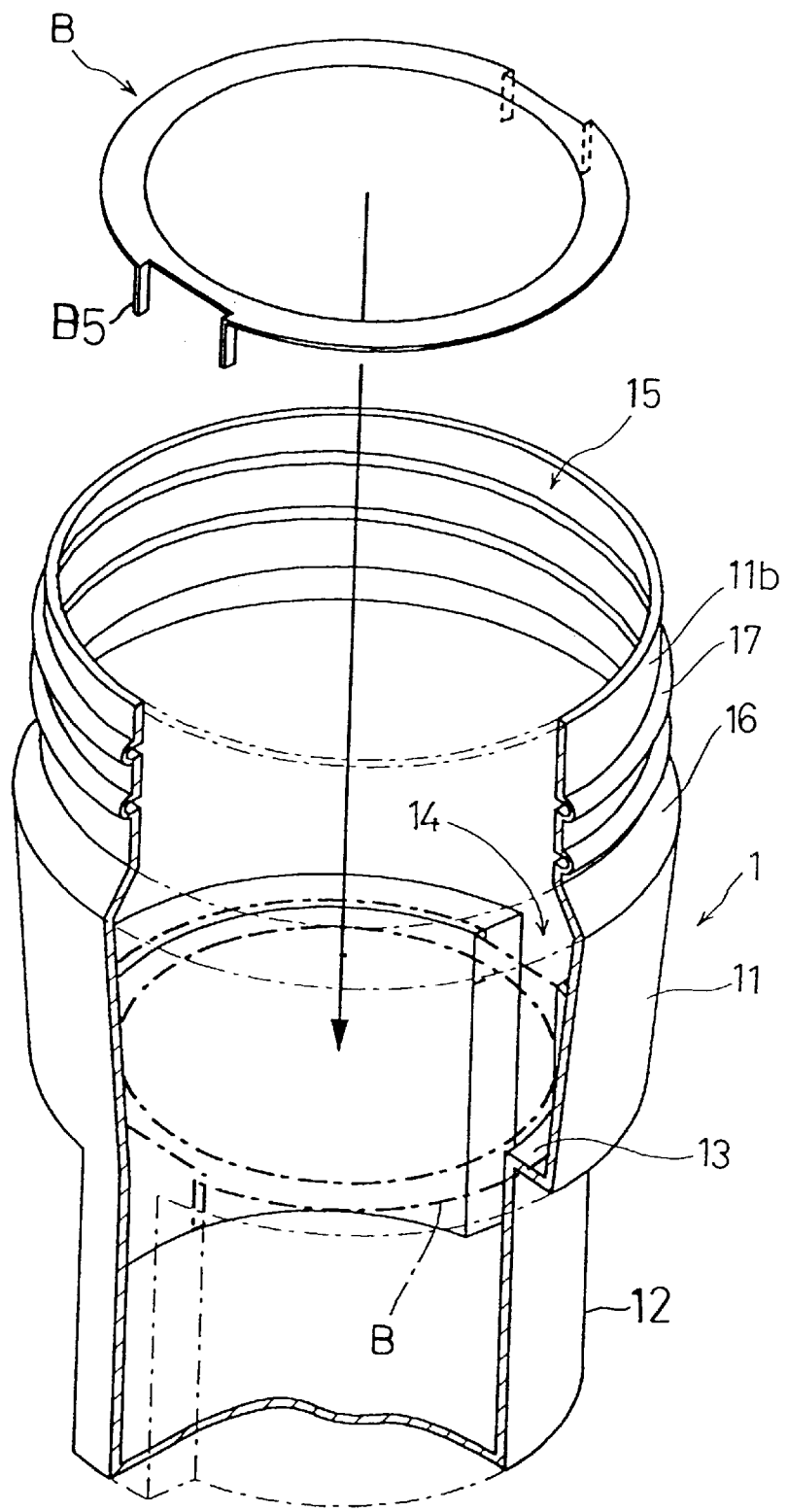
FIG. 5 is a perspective view in section showing principal portions of a plant culture vessel relating to a further embodiment of the invention.

(2) FIG. 5 shows an alternative construction according to the present invention. In this, at a position of the plant mount B corresponding to the vertical communicating portion 14, the edge portion B2 includes a cutout, and there is provided an engaging portion B5, in the form of projection, for fixing this edge portion B3 and the vertical communicating portion 14 in position relative to each other. This construction is advantageous for making it easier to reserve a large gap in the vertical communicating portion 14 for allowing insertion of the culture medium replacing instrument G. Further alternatively, in the periphery of the edge portion, there may be provided a guide piece, like the engaging portion B5, extending downwardly. Although this guide piece may extend straight downward toward the bottom, it will be more advantageous to extend downward with an inclination toward the vessel wall, as such inclined arrangement can improve its guiding effect.

Further, as shown in FIG. 5. the vertical communicating portions 14 and the reduced-diameter portions 12 may be formed cylindrical to the lower end of the vessel.

(3) The reliable sealed construction and the effect for preventing bacteria entry described above may be achieved also when the male thread is provided to the top lid and the female thread is provided to the vessel body. However, in terms of readiness of handling of the vessel, the construction described in the foregoing embodiment is preferred.

Figure 6:
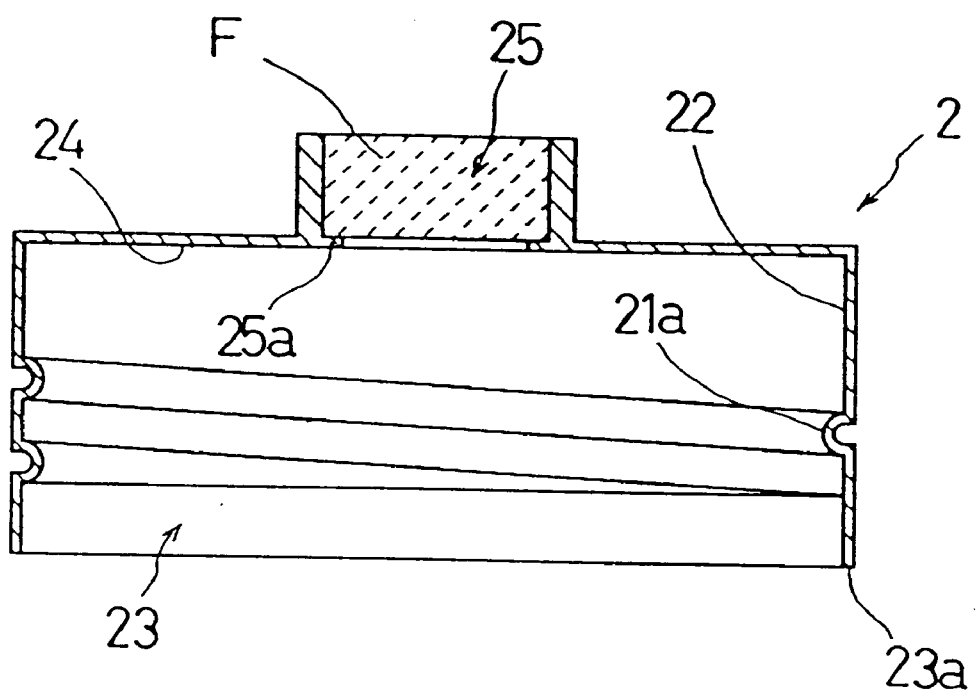
FIG. 6 is a section view showing a top lid for use with the plant culture vessel relating to the further embodiment.

(4) In the top lid 2, as shown in FIG. 6, a flange 25a may be provided at the lower end of the air communicating opening 25 so as to function as a retaining portion for retaining the filler material F.

(5) In the foregoing embodiment, the air communicating opening is provided at the center of the top lid. However, the position of this opening is not limited thereto. For instance, the opening may be provided immediately above the vertical communicating portion 14 and also the filler material F to be filled within the opening may be formed of elastic material capable of elastically forming a hole for allowing insertion of the pipe portion of the culture medium replacing instrument when necessary, while closing and sealing the hole normally, i.e. when the instrument is not inserted.

This construction is advantageous for minimizing opening/closing the lid. In this case, the upper edge of the opening should be formed as an outwardly widening tapered shape, so as to prevent the culture solution supplied through the pipe of the instrument from running onto the lid.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A plant culture vessel comprising:

a vessel body capable of housing therein a plant mount for mounting thereon a plant to be cultured and a culture medium for culturing the plant;

a top lid detachably attached to the vessel body;

a support portion provided on a peripheral wall of the vessel body in the form of a reduced-diameter portion projecting to the inside of the vessel body, the culture medium being housed in a space downwardly of the plant mount as supported on the support portion; and a vertical communicating portion provided between an outer edge of the plant mount and an inner peripheral wall portion of the vessel body for allowing vertical insertion of an instrument including a culture medium replacing instrument therethrough to the space downwardly of the plant mount; wherein upwardly of the support portion of the vessel body, there is formed an upwardly widening plant accommodating portion.

2. A plant culture vessel according to claim 1, wherein a downwardly extending face inside the vessel connecting between the reduced-diameter portion and a portion of the inner peripheral wall portion other than the reduced-diameter portion has a downwardly widening tapered shape.

3. A plant culture vessel according to claim 2, wherein upwardly of the support portion of the vessel body, there is formed an upwardly widening plant accommodating portion.

4. A plant culture vessel according to claim 3, wherein the plant mount includes a metal mesh in the form of an opened cage and a flange-like frame portion attached to an edge portion of the metal mesh; and the vessel body is sized such that the reduced-diameter portion has an inner diameter greater than an outer diameter of the edge portion and smaller than an outer diameter of the frame portion and also that a large diameter portion forming the vertical communicating portion has an inner diameter greater than the outer diameter of the frame portion, the frame portion being mounted and supported on the support portion.

5. A plant culture vessel according to claim 4, wherein an upper bottom portion of the top lid defines an air communicating opening, which opening is filled with a filler material for preventing entry of bacteria.

6. A plant culture vessel according to claim 1, wherein at a position of the plant mount corresponding to the vertical communicating portion, the edge portion includes a cutout; and there is provided an engaging portion for fixing this edge portion and the vertical communicating portion in position relative to each other.

7. A plant culture vessel according to claim 6, wherein the vertical communicating portion and the reduced-diameter portion are formed cylindrical to the lower end of the vessel.

8. A plant culture vessel comprising:

a vessel body capable of housing therein a plant mount for mounting thereon a plant to be cultured and a culture medium for culturing the plant;

top lid detachably attached to the vessel body;

a male thread provided in either one of an outer wall of the cylindrical peripheral wall of the vessel body or a cylindrical wall of the top lid;

a female thread provided to an inner wall portion of the other one of the cylindrical peripheral wall of the vessel body and the cylindrical peripheral wall of the top lid, the female thread being engageable on the male thread; and a tapered portion provided on a side opposite to an opening of the male thread, the tapered portion having an increasing diameter away from the opening, such that when the female thread and the male thread become engaged with each other a lower end portion of the female thread on the side of the opening comes into tight contact with the tapered portions; wherein said vessel body defines, at an upper portion thereof, a plant accommodating portion having an upwardly widening tapered shape.

9. A plant culture vessel comprising:

a vessel body capable of housing therein a plant mount for mounting thereon a plant to be cultured and a culture medium for culturing the plant;

a top lid detachably attached to the vessel body;

a support portion provided on a peripheral wall of the vessel body in the form of a reduced-diameter portion projecting to the inside of the vessel body, the culture medium being housed in a space downwardly of the plant mount as supported on the support portion; and a vertical communicating portion having an outer wall and a side wall, the vertical communicating portion being provided between an outer edge of the plant mount and an inner peripheral wall portion of the vessel body for allowing vertical insertion of an instrument including a culture medium replacing instrument therethrough to the space downwardly of the plant mount;

wherein said outer wall of the vertical communicating portion is substantially coplanar with said peripheral wall of the vessel body excluding said support portion, and said side wall of the vertical communicating portion interconnects between said outer wall of this communicating portion and said support portion of the vessel body.

10. A plant culture vessel comprising:

a vessel body capable of housing therein a plant mount for mounting thereon a plant to be cultured and a culture medium for culturing the plant;

a top lid detachably attached to the vessel body;

a support portion provided on a peripheral wall of the vessel body in the form of a reduced-diameter portion projecting to the inside of the vessel body, the culture medium being housed in a space downwardly of the plant mount as supported on the support portion; and a vertical communicating portion provided between an outer edge of the plant mount and an inner peripheral wall portion of the vessel body for allowing vertical insertion of an instrument including a culture medium replacing instrument therethrough to the space downwardly of the plant mount;

wherein said plant mount is provided in the form of a mesh cage having a concave portion and a side portion surrounding the concave portion, the plant as mounted on the plant mount being submerged into the culture medium in association with movement of the vessel body.

11. A plant culture vessel comprising:

a vessel body capable of housing therein a plant mount for mounting thereon a plant to be cultured and a culture medium for culturing the plant;

a top lid detachably attached to the vessel body;

a support portion provided on a peripheral wall of the vessel body in the form of a reduced-diameter portion projecting to the inside of the vessel body, the culture medium being housed in a space downwardly of the plant mount as supported on the support portion; and a vertical communicating portion provided between an outer edge of the plant mount and an inner peripheral wall portion of the vessel body for allowing vertical insertion of an instrument including a culture medium replacing instrument therethrough to the space downwardly of the plant mount;

wherein upwardly of the support portion inside the vessel body, there is formed a plant accommodating space capable of accommodating the plant with grown foliage.

12. A plant culture vessel comprising:

a top lid having a ceiling portion and an opened bottom;

a vessel body having an opened upper end portion, a bottom portion and a side wall portion interconnecting between the upper end portion and the bottom;

an attaching face formed in the upper end portion of the vessel body for allowing detachable attachment of the top lid thereto;

a support portion formed in the side wall portion of the vessel body;

a plant mount supported on the support portion and having a number of pores extending therethrough, said plant mount substantially dividing an inner space of the vessel body into an upper space portion providing a plant accommodating space capable of accommodating the grown plant and a lower space providing a culture medium accommodating space capable of accommodating a culture medium; and a communicating portion formed in the support portion for allowing access of a plant medium replacing instrument through said plant accommodating space into said culture medium accommodating space.

13. The plant culture vessel according to claim 12, wherein said plant mount comprises a cage member forming the number of pores substantially over an entire face thereof and a frame member connected to an edge portion of the cage member, and the cage member projects into said culture medium accommodating space when the frame member is placed on the support portion.

14. A plant culture vessel comprising:

a top lid having a ceiling portion and an opened bottom;

a vessel body having an opened upper end portion, a bottom portion and a side wall portion interconnecting between the upper end portion and the bottom, an inner space of the vessel body being substantially divided into an upper space portion providing a plant accommodating space capable of accommodating a grown plant and a lower space providing a culture medium accommodating space capable of accommodating a culture medium;

an attaching face formed in the upper end portion of the vessel body for allowing detachable attachment of the top lid thereto;

a plant support portion formed of a plurality of stepped portions extending in a cross-sectional direction of the vessel body, said stepped portions being formed by forming the side wall portion of the vessel body partially concave; and a communicating portion formed between the plurality of stepped portions for allowing access of a plant medium replacing instrument through said plant accommodating space into said culture medium accommodating space, a portion of the side wall portion forming the communicating portion having a face coplanar with the other portion of the side wall portion excluding the plant support portion.

15. A plant culture vessel comprising:

a top lid having a ceiling portion and a circular opened portion;

a vessel body having an opened upper end portion, a bottom portion and a side wall portion interconnecting between the upper end portion and the bottom, an inner space of the vessel body being substantially divided into an upper space portion providing a plant accommodating space capable of accommodating a grown plant and a lower space providing a culture medium accommodating space capable of accommodating a culture medium;

an attaching portion formed in the upper end portion of the vessel body for allowing detachable attachment of the top lid thereto, said attaching portion comprising a conical tapered portion including an upper portion having a smaller diameter than a diameter of the circular opened portion of the top lid and a lower portion having a greater diameter than the diameter of the circular opened portion, and a threaded portion formed at an upper area of the upper portion of the conical tapered portion the threaded portion being threadable with the top lid, the circular opened portion coming into gapless contact with the conical tapered portion in association with a downward screwing movement of the top lid;

a plant support portion formed in the side wall portion of the vessel body; and a communicating portion formed in the plant support portion for allowing access of a plant medium replacing instrument through said plant accommodating space into said culture medium accommodating space.

* * * * *